US007594142B1

(12) United States Patent
O'Leary et al.

(10) Patent No.: US 7,594,142 B1
(45) Date of Patent: Sep. 22, 2009

(54) ARCHITECTURE FOR AUTOMATED DETECTION AND ANALYSIS OF SECURITY ISSUES

(75) Inventors: Arthur J O'Leary, Redmond, WA (US); Robert C Fly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 11/427,923

(22) Filed: Jun. 30, 2006

(51) Int. Cl.
*G06F 11/00* (2006.01)
(52) U.S. Cl. ...................................... 714/38
(58) Field of Classification Search ................ 714/38
See application file for complete search history.

(56) References Cited

U.S. PATENT DOCUMENTS

| | | | | |
|---|---|---|---|---|
| 7,284,274 | B1 * | 10/2007 | Walls et al. | 726/25 |
| 7,293,202 | B2 * | 11/2007 | Kamani et al. | 714/38 |
| 2002/0073366 | A1 * | 6/2002 | Cho | 714/718 |
| 2002/0188890 | A1 * | 12/2002 | Shupps et al. | 714/38 |
| 2003/0191985 | A1 * | 10/2003 | Barrett | 714/32 |
| 2007/0050677 | A1 * | 3/2007 | Klamik | 714/38 |

OTHER PUBLICATIONS

Xu et al., "Application of Fuzzy Expert System in Test Case Selection For System Regression Test", 2005, IEEE, pp. 120-125.*
Miller et al., "An Empirical Study of the Reliability of UNIX Utilities", 1989.*
Forrester et al., "an Empirical Study of the Robustness of Windows NT Applications Using Random Testing", 4th USENIX Windows System Symposium, Aug. 2000.*
Miller et al., "Fuzz Revisited: A Re-examination of the Reliability of UNIX Utilities and Services", Oct. 1995.*

* cited by examiner

*Primary Examiner*—Michael C Maskulinski
(74) *Attorney, Agent, or Firm*—Lee & Hayes, PLLC

(57) ABSTRACT

Systems, methods, and/or techniques ("tools") that relate to an architecture for automated detection and analysis of security issues are described herein. One aspect of the tools provides a watchdog application that generates fizzing signals that enable or disable fuzzing of test cases that are to be received by the watchdog application. The watchdog application also receives notifications of test cases that are to be executed on a system under test with which the watchdog application is associated. Finally, the watchdog application monitors the system under test when it is executing the test case.

17 Claims, 8 Drawing Sheets

ARCHITECTURE FOR AUTOMATED DETECTION AND ANALYSIS OF SECURITY ISSUES

BACKGROUND

Fuzzing refers to a process of altering the data of valid test cases and program input (collectively, "fuzzed test data"), so as to generate new test cases. Fuzzed test data may be fuzzed to test a variety of different types of software or components. Typically, the fuzzing process is automated, guided by alterations programmed by a human tester. The fuzzing process may include running a series of simulated attacks against a component under test, with a view toward discovering flaws or bugs in the component under test.

As additional background and context on fuzzing, "dumb" fuzzing techniques do not inspect the data that is being fuzzed, and randomly alters or generates values to be fed to the components under test. On the other hand, "smart" fuzzing techniques attempt to inspect the layout of the data that is being fuzzed, so that the fuzzed data may look more correct. In this manner, the fuzzed data may pass restrictive parsing or filtering before reaching the components under test.

Generative fuzzing is a process in which data is created without any valid data as a baseline for fuzzing, although a schema may represent any format to which the fuzzed data is to conform. Mutilation fuzzing involves modifying and mutilating already valid data, in an effort to create additional test cases.

Previous fuzzing architectures typically include different components that perform various functions related to the overall fuzzing operation. These previous architectures may not enable these different components into communicate with one another. Because of this shortcoming, it may be difficult for testers to determine when a bug has been located, or to isolate which fuzzed traffic caused a particular problem Additionally, existing fuzzing techniques may not collect into one location all of the data that results from the fuzzing operations. Thus, it may be difficult to correlate the results from a variety of different test runs, and determine which set of test conditions caused a particular error to occur. In the context of testing an application in, for example, a client-server environment, a server application may be tested by submitting a large number of test requests to it. If one of these numerous requests crashes the server or causes the server to fail, it may be difficult to isolate which particular request, sequence of requests, or other circumstances led to the failure.

SUMMARY

Systems, methods, and/or techniques ("tools") that relate to an architecture for automated detection and analysis of security issues are described herein. One aspect of the tools provides a watchdog application that may generate fuzzing signals that enable or disable fuzzing of test cases that are to be received by the watchdog application. The watchdog application also receives notifications of test cases that are to be executed on a system under test with which the watchdog application is associated. Finally, the watchdog application monitors the system under test when it is executing the test case.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter.

BRIEF DESCRIPTIONS OF THE DRAWINGS

Tools related to an architecture for fuzz testing are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide an architecture for fuzz testing. This discussion also describes other techniques and/or processes that may be performed by the tools.

Figure 1:
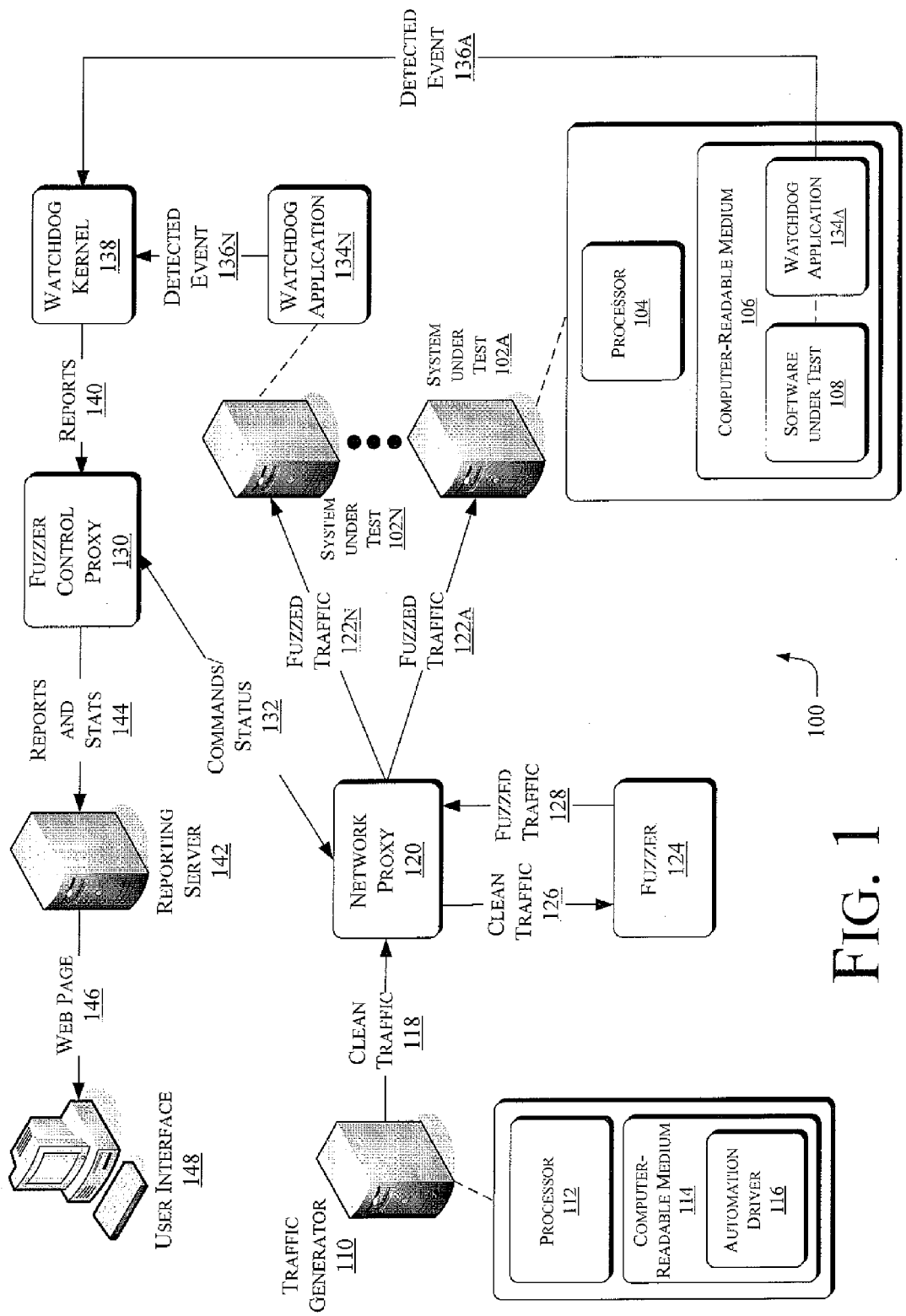
FIG. 1 is a block diagram of an operating environment suitable for implementing an architecture for fuzz testing.

FIG. 1 illustrates an operating environment 100 suitable for providing an architecture for fuzz testing. The operating environment 100 may include one or more systems under test, two examples of which are shown in FIG. 1 at 102A and 102N. The systems under test are referenced herein generally at 102. It is understood that implementations of the operating environment may include any number of different systems under test. The systems under test may take the form of client machines, server machines, and/or standalone machines.

In general, the systems under test 102 may be computer-based systems that include one or more processor(s) 104 and computer-readable media 106. The computer-readable media may contain instructions that, when executed by the processor, perform any of the tools or related functions as described herein. The processor may be configured to access and/or execute the instructions embedded or encoded onto the computer-readable media. The processor may also be categorized or characterized as having a given architecture. The system under test may include a computing device, such as a network or other server, a desktop computer, a laptop or notebook computer, or any other computing device configured to perform the functions described herein in connection with the systems under test.

The computer-readable media 106 may include one or more instances of software under test 108. FIG. 1 shows one instance of the software under test for convenience only. The software under test may take the form of application software, operating system software, middleware, client software, server software, or any other form or type of software. It is also noted that the systems under test 102 may be tested as described herein with the software under test, or apart from the software under test.

The operating environment 100 may also include a traffic generator 110, which may include a processor 112 and computer-readable medium 114. The above description of the processor 104 and computer-readable medium 106 applies equally to the processor 112 and computer-readable medium 114. However, it is noted that the processor 104 need not be the same type and configuration as the processor 112, and that the computer-readable medium 106 need not be the same type and configuration as the computer-readable medium 114.

The computer-readable medium 114 may include an automation driver 116, which functions to generate clean traffic 118. The clean traffic serves as a starting point for testing the systems and/or software under test using fuzzing techniques. The clean traffic may take the form of test data that approximates the type of data that the systems and/or software would be expected to process during normal operations. Generally, the automation driver 116 generates test cases used for fuzzing test attacks directed against the systems under test.

A network proxy 120 receives the clean traffic 118 and produces fuzzed traffic 122 therefrom. FIG. 1 shows two instances of fuzzed traffic 122A and 122N, which are routed to the systems under test 102A and 102N, respectively. More particularly, the network proxy 120 may forward the clean traffic 118 to a fuzzer component 124, which fuzzes the clean traffic into corresponding fuzzed traffic. For ease of reference only, the clean traffic as provided to the fuzzer is denoted at 126, and the fuzzed traffic as output by the fuzzer is denoted at 128. The interactions between the network proxy and the fuzzer are described in more detail below in connection with FIGS. 3 and 4. Generally, the fuzzed traffic is formulated so as to test the systems 102, and to expose or reveal bugs or flaws in the systems 102.

The network proxy and the fuzzer are responsive to configuration commands received from a fuzzer control proxy (FCP) 130. The FCP 130 may be implemented as, for example only, a singleton that is callable throughout the system that persists information about a current fuzzer run. One non-limiting example of such an object is a .NET Remote Object. In providing these examples, it is noted that other implementations are possible. This information about the current fuzzer run may include the current fizzing iteration, the number of bugs found to date, what types of flaws or bugs on which the fuzzer is currently focusing, and whether the fuzzer is enabled or disabled. In this manner, the FCP may control the operation of the network proxy and/or the fuzzer via appropriate commands, which are denoted generally at 132. As discussed in more detail below, the FCP may also receive information representing the results of particular fuzzing runs.

The FCP may define different levels of criticality for flaws or bugs, and specify handling for flaws or bugs having different levels of criticality. For example, flaws or bugs may be classified in nature as informational, warning, errors, severe errors, or the like.

Turning to the systems under test 102, the systems under test may be associated with a respective instance of a watchdog application 134. In the non-limiting example shown in FIG. 1, the system 102A includes a watchdog application 134A, and the system 102N includes a watchdog application 134N. The watchdog applications may be operable to deliver information related to the health of the various systems under test, as well as providing data related to determining the success of test cases. The systems under test 102 may store and execute the watchdog applications 134 from suitable computer-readable media. For clarity of illustration, only the system 102A is shown with the watchdog application 134A residing in the computer-readable medium 106. A computer-readable medium is not expressly shown for the system 102N, although it is understood that the watchdog application 134N could reside in a suitable computer-readable medium.

The systems under test may process the fuzzed traffic 122 in one or more test runs. As the systems under test process the fuzzed test traffic, the watchdog applications 134 generally monitor the status or "health" of the systems 102, and detect any evidence of successful attacks on the systems that may result from processing the fuzzed traffic 122. The watchdog applications thus monitor for any indications that a particular security bug has been discovered or exploited by the fuzzer. For example, a watchdog application that monitors a file system on a server may detect when a directory traversal attack successfully caused the traffic generator 110 to access resources that should be off limits.

Over the course of one or more test runs, the systems 102 may exhibit bugs or flaws caused by processing the fuzzed traffic 122. The watchdog applications detect any occurrences of such bugs or flaws, and generate appropriate events 136 corresponding to these occurrences. FIG. 1 denotes at 136A an event occurring on the system 102A as detected by the watchdog application 134A, and denotes at 136N an event occurring on the system 102N as detected by the watchdog application 134N.

A watchdog kernel 138 receives the detection events 136 as reported by the various watchdog applications 134. The watchdog kernel collects these reported events, correlates the events to the systems 102 on which they occurred, and reports these events to the fuzzer control proxy (FCP) 130. The events as reported to the FCP are indicated at 140. The watchdog kernel provides a centralized facility for initializing the watchdog applications for a given test run, and for reporting errors detected by the watchdog applications after the test run begins. The watchdog kernel may gather any configuration information appropriate for the watchdogs, for example, criticality levels as assigned to different classes of bugs. The watchdog kernel may also provide a universal reporting interface through which data from the watchdogs may be filtered and analyzed. If the data is determined to meet a particular threshold for importance and/or relevance, then the watchdog kernel may pass the data on to the FCP. The watchdog kernel may establish a single connection with the FCP 130 to alert the FCP of potential bugs that have occurred on the systems under test.

The FCP 130 may log to a reporting server 142 data such as statistics for multiple test runs, as well as the reported events 140. The reporting server thus provides a repository for statistics relating to reported events that have occurred on the systems 102. For example, the reporting server may receive data 144 that indicates the state of the fuzzer at any given time, parameters relating to a given fuzzing run, detected events that resulted from the fuzzing run, or the like. The reporting server may provide an interface to the fuzzer architecture that is accessible to human test personnel.

Using the data collected and stored by the FCP, the reporting server 142 may generate a dynamic web page 146 that human personnel can monitor for live statistics on the fuzzing architecture. The dynamic web page may be presented via, for example, a user interface 148. In addition to enabling human personnel to extract information from the fuzzing system, the user interface and/or the dynamic web page may also enable testers or administrators (collectively, "testing personnel") to control settings that are propagated throughout the fuzzing system. For example, if the testing personnel wish to turn the fuzzer off, to have a particular aspect of the network traffic analyzed, or to perform some other similar function, the personnel may do so by using this web page to manipulate the values stored by the FCP.

In providing the above description of the operating environment 100, it is noted that the watchdog applications, the watchdog kernel, the FCP, and the reporting server are shown as separate entities in FIG. 1 only to facilitate discussion of functions performed by each. However, the operating environment 100 shown in FIG. 1 is illustrative, rather than limiting. Further, one or more of the watchdog applications, the watchdog kernel, the FCP, and the reporting server could reside on the same physical machine.

Additionally, it is noted that the watchdog applications, the watchdog kernel, the FCP, and the automation driver may be implemented as software modules that are executed on one or more host machines. For clarity of illustration, FIG. 1 shows these components are in block form only, but it is understood that one or more of these components may be implemented on any suitable machine.

Figure 2:
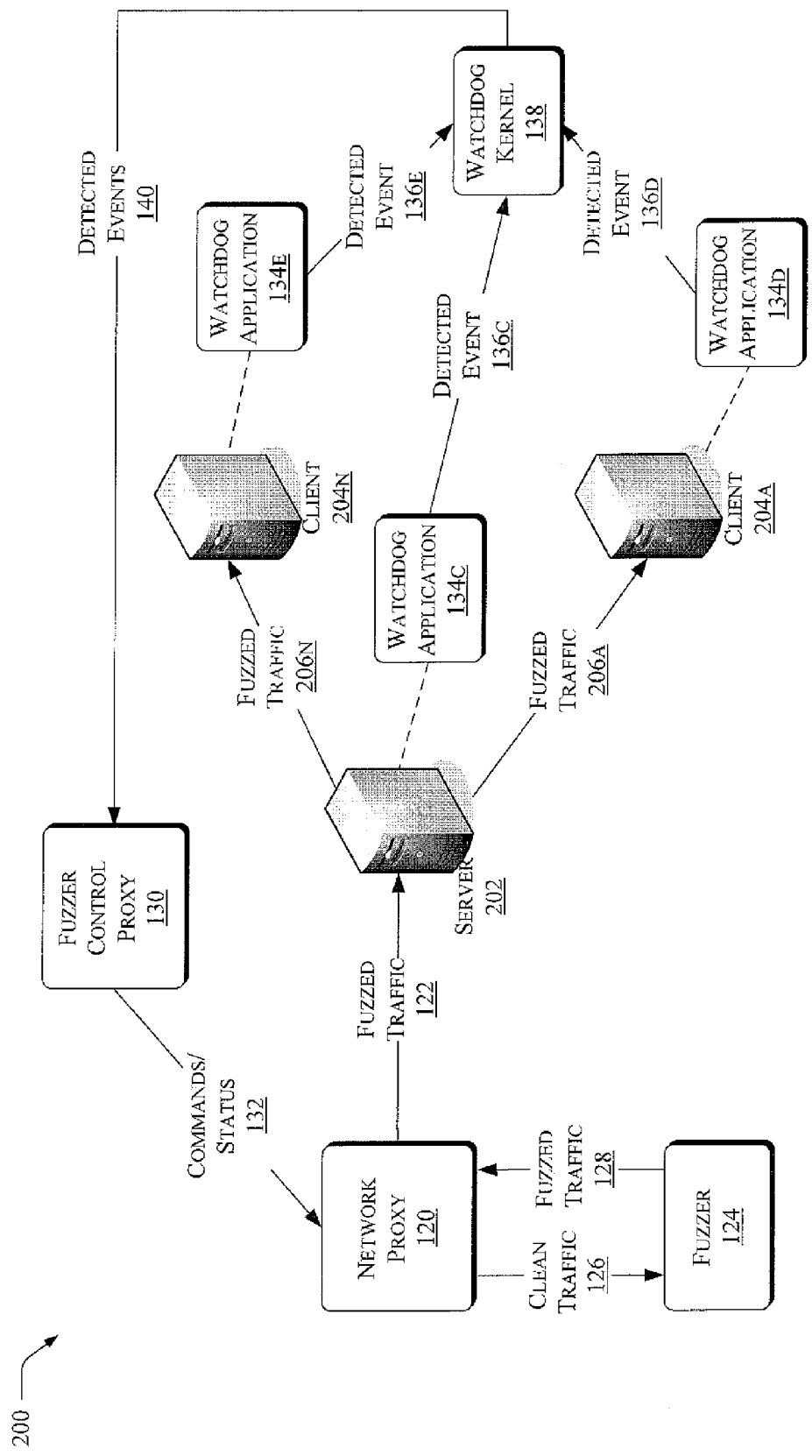
FIG. 2 is a block diagram of another operating environment suitable for implementing an architecture for fuzz testing.

FIG. 2 illustrates another operating environment 200 that may be suitable for implementing the architecture for fuzz testing. Elements that are carried forward from FIG. 1 are denoted by identical reference numbers. In FIG. 2, the systems under test 102 are represented by a server 202 that receives the fuzzed traffic 122 and re-directs it to a client 204A and to a client 204N. For convenience, the fuzzed traffic as directed to the client 204A is denoted at 206A, and the fuzzed traffic as directed to the client 204N is denoted at 206N.

FIG. 2 shows one server 202 and two clients 204A and 204B for convenience only, and not to limit implementations of the operating environment 200. For example, other implementations may include multiple servers 202, which in turn may be associated with any number of clients.

The server 202 and the clients 204A and 204N may be associated with instances of the watchdog applications, denoted at 134C, 134D, and 134E, respectively. The descriptions of the watchdog applications from FIG. 1 apply equally to FIG. 2.

The watchdog applications 134C, 134D, and 134E generate detected events 136 when they occur on the server and/or the clients. These detected events are denoted respectively at 136C, 136D, and 136E. An instance of the watchdog kernel 138 receives these detected events 136C, 136D, and 136E in the manner described above, and forwards an aggregated set of detected events 140 to the FCP 130. In turn, the FCP may interact with the reporting server 142 and the user interface 148 (not shown in FIG. 2) as described above in FIG. 1.

Figure 3:
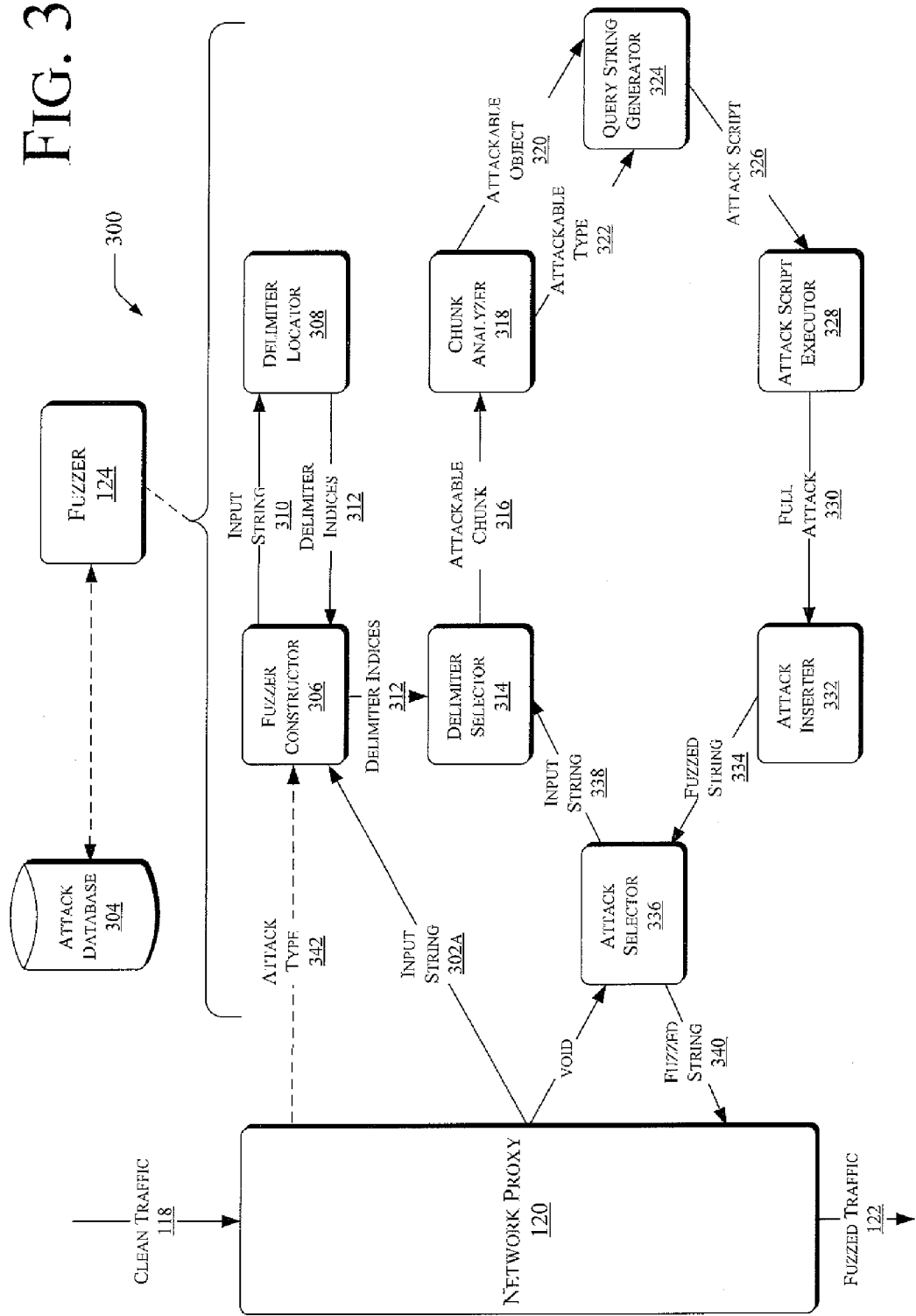
FIG. 3 is a combined data and process flow diagram of interactions between a network proxy and a fuzzer, as may be performed in connection with an architecture for fuzz testing.

Having described the above examples of operating environments for providing an architecture for fuzz testing, the discussion now turns to a description of data and process flows related to the network proxy 120 and the fuzzer, now presented with FIG. 3.

FIG. 3 illustrates data and process flows 300 relating to interactions between the network proxy 120 and the fuzzer 124. Illustrative components of the fuzzer are shown and now described in FIG. 3.

As described above, the network proxy 120 interfaces with the fuzzer to produce fuzzed traffic 122 as output that is based on clean input traffic 118. The clean traffic may include one or more input strings 302, at least portions of which may provide opportunities for fuzzing. Illustrative but non-limiting examples of these "fuzzable" input strings may include e-mail addresses, file and/or directory path names, URL addresses, dates, times, or the like. Additional examples may include, but are not limited to raw binary data, network-related data, protocol-message headers, resource names, Boolean values, or the like. Instances of the input string may be routed to the fuzzer 124 for fuzzing.

An attack database 304 may communicate with the fuzzer 124 to enable the fuzzer to select suitable attacks against the systems or software under test 120. The attack database may contain known values that have caused bugs, flaws, or other security issues in the past with systems under test. The attack database may also contain scriptable representations of context-sensitive attacks, and other values that could lead to security vulnerabilities when presented to the systems under test, or an application running thereon.

The attack database 304 may rank or weight attacks, so that only the most interesting test cases are returned. In some instances, the fuzzer 124 may choose test cases or attacks based on the ranking or weighting of the attacks. In other instances, the fuzzer may choose test cases or attacks at random, and ignore the ranking or weighting of the attacks.

In some implementations, the attack database 304 may be hosted on a machine separate from the fuzzer 124, while in other implementations, the attack database and the fuzzer may be hosted on the same machine. In any event, attacks may be updated and added to the attack database when new vulnerabilities are discovered. In doing so, the architecture may test to verify that systems and/or applications are not vulnerable to attacks that have worked previously against similar products.

The following table presents several examples of scriptable representations of attacks as they may be stored in the attack database:

| Attack Script | Description |
| --- | --- |
| {R: A, 2000000} | Generates a string of 2000000 A characters for testing Buffer Overruns. |
| {R: ../, 2} | Generates the string ../../, which is appended into file paths in order to exploit directory traversal bugs. |
| {MD5} | Returns the MD5 hash for the input string. |
| {RAND} | Returns a string of random characters that is of the same length as the input string. If the original string consists entirely of digits, then only digits are used in creating the new string. This is useful in attempting session-hijacking attacks. |
| {RAND, +1}. | Analyzes the original string, and adds some determined value to the original value in an attempt to increment the string by a certain amount for usage in session-hijacking attacks. |
| {RAND, +RAND} | |
| {OCTAL} | Returns the octal-encoded value for the original string. |
| {FILE-EXT: SHORT} | Returns the short (8.3 format) of the file path and name. |

The fuzzer 124 may include a fuzzer constructor method 306 that receives the input string 302. For convenience, the input string as provided to the fuzzer constructor is denoted at 302A. The fuzzer constructor in turn passes the input string to a delimiter locator 308. The input string as provided to the delimiter locator is denoted at 310. The delimiter locator parses the input string, and locates instances of any delimiters in the input string. Delimiters may be, for example only, any convenient character used to separate logical sub-portions of the input string from one another. The delimiters may be predefined, or may be detected dynamically in a given input string. Assuming that the input string represents a date, for instance, a suitable delimiter might be a "slash" character, a "dash" character, a "blank" character, or any other character used to separate month, day, and year fields of the date.

In any event, the delimiter locator generates a list of delimiter indices 312 that indicate where the delimiters appear in the input string. The delimiter locator provides this list 312 to the fuzzer constructor 306. In turn, the fuzzer constructor may then pass the list of delimiter indices 312 to a delimiter selector 314. The delimiter selector processes the delimiter indices 312 against the input string 302A to identify the sub-portions of the input string. For convenience, these sub-portions are referred to herein as "chunks". These chunks may be fuzzed and then used to attack the systems or software under test.

The attackable chunks, denoted at 316, are provided to a chunk analyzer 318, which processes the chunks to determine what types of substrings are in the chunks. The chunk analyzer may also determine whether the substrings are to be attacked, and what types of attacks may be most appropriate to direct against these substrings. For example, returning to the date example, the chunk analyzer may isolate the month, day, and year portions of the date as respective chunks. The chunk analyzer may also determine whether the chunks are represented in string or integer formats, and depending on the format of the chunks, may specify particular attacks to be run against the chunks.

The chunk analyzer 318 may output data representing an attackable object, denoted at 320. The chunk analyzer may also output data representing a type associated with the attackable object, denoted at 322.

A query string generator 324 may receive the attackable object representation 320 and the attackable object type 322. The query string generator may formulate an appropriate attack, for example, one of the attack scripts shown in the table above, or another attack script. In any event, the query string generator outputs an attack script 326.

An attack script executor 328 receives the attack script 326 and executes the attack script so as to expand the chosen attack into an attack string. This full or expanded attack string is denoted at 330.

An attack inserter 332 receives the full or expanded attack string 330, and inserts the attack string into an appropriate location in the input string. The attack inserter effectively substitutes a portion of the input string with a fuzzed equivalent of the string that includes the expanded attack string 330. The fuzzed string is denoted at 334.

An attack selector 336 chooses a next attack to apply against the input string. For example, assuming that possible attacks are listed in some order of preference, the attack selector may select the next sequential attack as listed in this order. Alternatively, the attack selector may randomly select a next attack from the list, without regard to any order of preference. In any event, the attack selector passes the input string (denoted at 338) to the delimiter selector, in case another iteration of the process flow 300 is appropriate.

The attack selector also outputs the fuzzed string 334 to the network proxy 120. The fuzzed string as output from the fuzzer 124 to the network proxy is denoted at 340. The fuzzed string 340 is incorporated into the fuzzed traffic 122, and passed on to the system under test for processing. Additionally, the fuzzer may notify the FCP of the change to the packet, and may push the contents of the packet to the FCP for display in the dynamic web page presented in the UI 148. For example, the webpage may present this packet as the "most recently fuzzed packet".

In some implementations, the network proxy may specify or pass through an attack type to be used by the fuzzer. This specified attack type is denoted in FIG. 3 at 342.

Having described in FIG. 3 the interaction between the fuzzer and the network proxy, the discussion now turns to a description of process and data flows that may be performed in connection with the network proxy. This description is now provided with FIG. 4.

Figure 4:
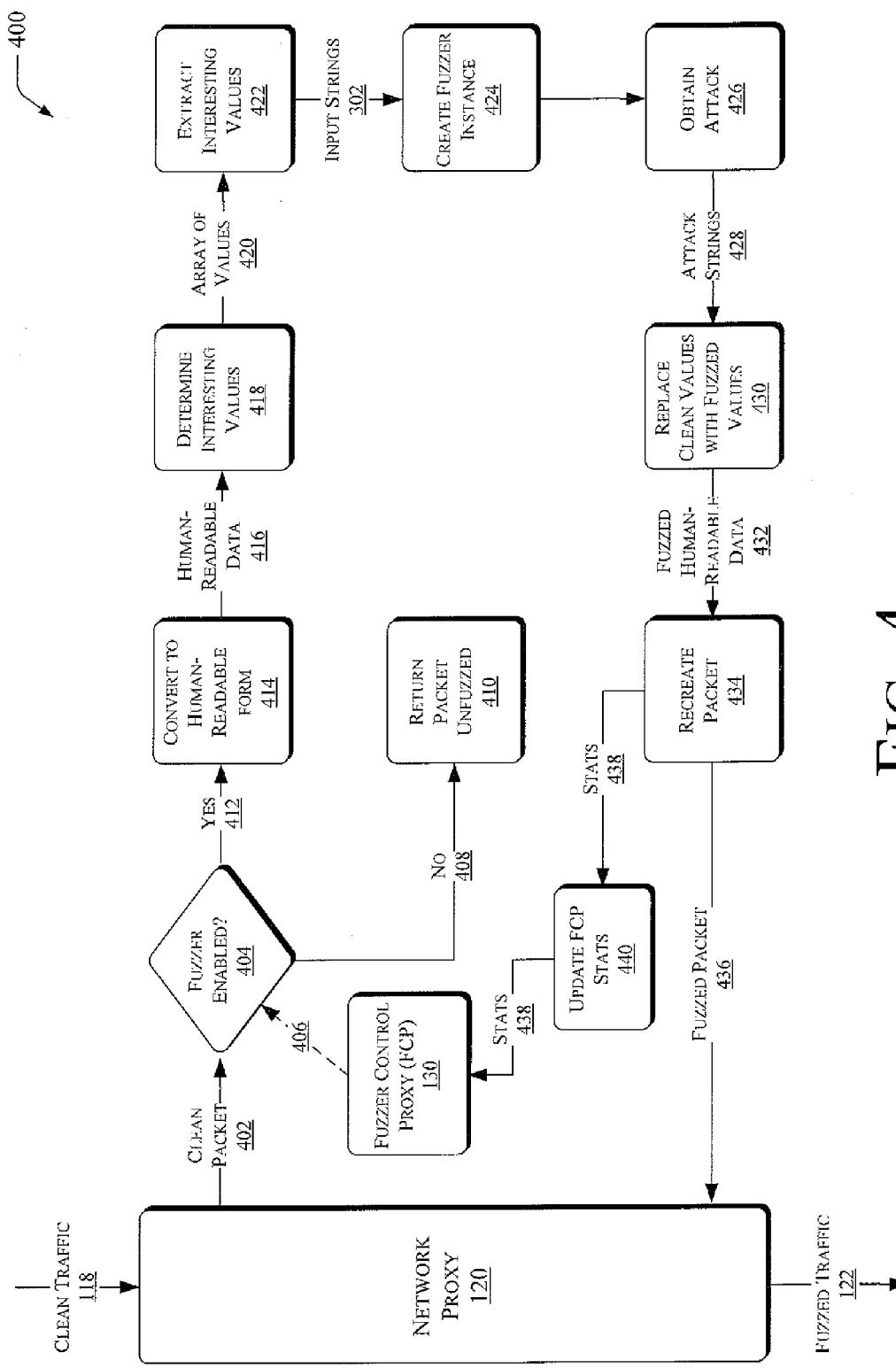
FIG. 4 is a combined data and process flow diagram, illustrating a program flow that may be performed in connection with an architecture for fuzz testing.

FIG. 4 illustrates process and data flows 400 related to the network proxy 120. As noted above, the network proxy receives clean traffic 118 and produces fuzzed traffic 122 therefrom. A representative clean packet 402 may be selected from the clean traffic, and processed as described herein. A decision block 404 determines whether fuzzing is enabled. Put differently, the decision block 404 may determine whether a fuzzer component, such as the fuzzer 124, is enabled. For example, a component, such as the fuzzer control proxy 130, may disable or enable fuzzing through appropriate commands. These commands are represented by the dashed line 406 appearing in FIG. 4. In addition to determining whether fuzzing is enabled, the decision block 404 may include determining whether to manipulate a given packet based on a set of filters. For example, block 404 may include filtering on types of traffic, methods within the traffic, direction of the traffic, strings within the traffic, or the like.

If fuzzing is not enabled, then the process flow 400 takes No branch 408 to block 410, where the clean packet 402 is returned unfuzzed to the network proxy. In the interests of clarity, FIG. 4 does not illustrate returning the clean packet to the network proxy, but this flow is nevertheless understood from FIG. 4 and the description herein.

From block 404, if fuzzing is enabled, then the process flow takes Yes branch to block 414. Block 414 may convert the clean packet to human-readable form, resulting in human-readable data 416. It is noted that some implementations may omit block 414.

Block 418 analyzes the human-readable data 416 and determines whether one or more portions of the data are of interest for fuzzing purposes. Block 418 outputs an array 420 that indicates which portions of the data 416 may be of interest for fuzzing.

Block 422 extracts from the data 416 those portions indicated by the array 420. These extracted portions are passed to block 424 as input strings 302. Recall that the input strings 302 are processed as shown in FIG. 3. Block 424 receives the input strings 302, and creates an instance of a fuzzer (e.g., the fuzzer 124), if the fuzzer has not already been instantiated.

Block 426 then obtains an attack to apply against the input strings. For example, block 426 may include performing at least portions of the flow 300 shown in FIG. 3 (e.g., block 336). Block 426 outputs attack strings 428, which represent a particular attack to be applied against portions of the input strings. Put differently, the attack strings are fuzzed substitutes of portions of the input strings.

Block 430 replaces the clean portions of the input strings with their fuzzed or attacked counterparts, resulting in fuzzed human-readable data 432, which is provided to block 434. Block 434 recreates a fuzzed packet 436 based on the fuzzed human-readable data, and forwards this fuzzed packet to the network proxy 120.

Block 434 also compiles statistics 438 related to the fuzzed packet. These statistics may include, for example, a copy of the fuzzed packet, a listing of fuzzed and clean portions of the packet, a copy of the clean counterparts of the fuzzed portions, an identifier of the current iteration of a given fuzzer run, or the like. These statistics 438 are passed to block 440, which updates the fuzzer control proxy 130 with these statistics 438.

In the foregoing manner, the fuzzer control proxy (FCP) is kept up-to-date on what attacks are being attempted against the systems and/or software at a particular time or during a given iteration of a fuzzing run. Recall that the FCP also receives notifications detected events 140, as described in FIGS. 1 and 2, and that the detected events 140 report detected events 136 that occur on systems under test. Thus, when detected events 136 and/or 140 result from bugs or other events that result from the fuzzing run, the FCP may readily determine which fuzzed attack test case caused the event. Accordingly, because the FCP communicates with several different components of the overall fuzzing architecture, the FCP may establish a cause-and-effect relationship between the test case and the event, and so notify the reporting server 142.

As an example of the foregoing, assume that the FCP receives a notification that an event having some level of severity occurred on a given machine at a given time. Given this notification, the FCP may refer to past statistics (e.g., at 438) that indicate what fuzzed traffic has been directed to the given machine. The FCP may gather a history containing one or more instances of fuzzed traffic sent to the given machine, and report accordingly to the reporting server 142. This report may include only the last instance of fuzzed traffic sent to the machine, or may include the last X instances of fuzzed traffic sent to the machine. X is a positive integer can be chosen as appropriate in a given implementation.

In turn, the reporting server may present data on this cause-and-effect relationship via the user interface 148. A human tester viewing this data on the user interface may readily visualize what fuzzed test case caused the event, thereby possibly expediting the discovery and resolution of software errors.

Having described the above data and process flow diagrams in FIGS. 3 and 4, the discussion now turns to a description of a process flow that may be performed in connection with, for example, the fuzzer control proxy. This description is now presented with FIG. 5.

Figure 5:
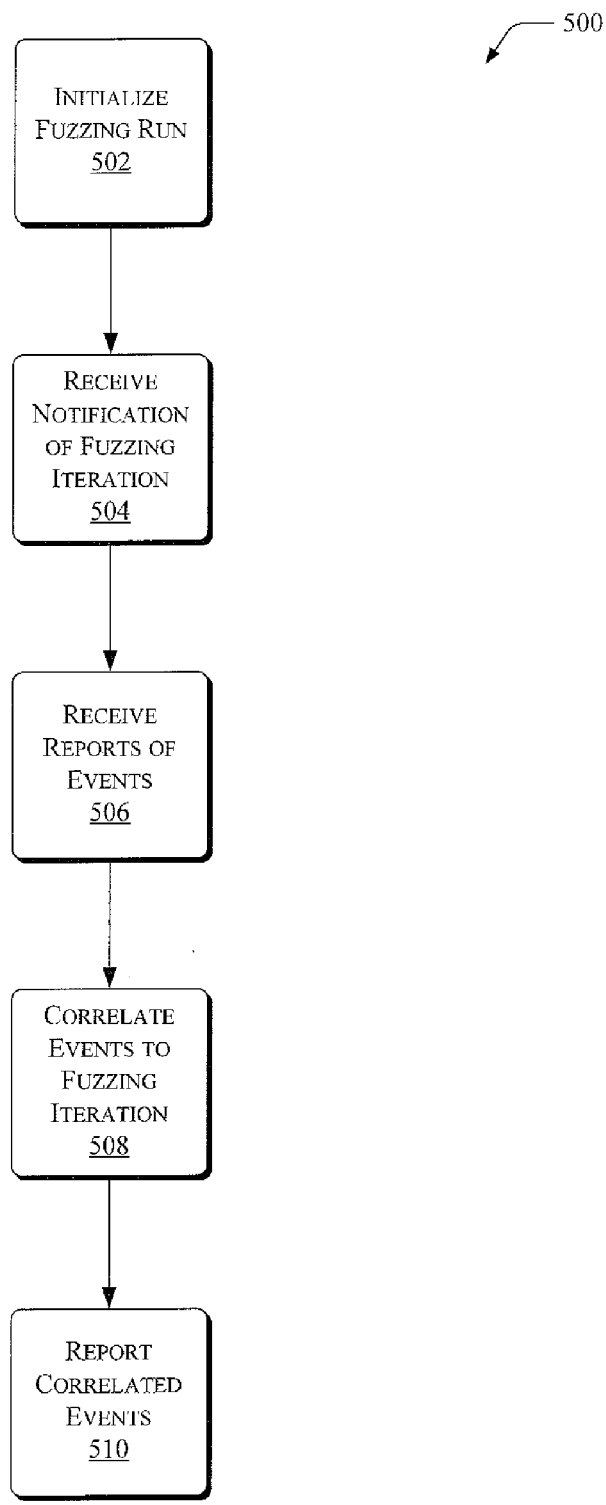
FIG. 5 is a flow diagram of a process by which the architecture may perform fuzz testing.

FIG. 5 illustrates a process flow 500 related to the architecture for fuzz testing. While the process flow 500 is described in connection with a fuzzer control proxy such as, for example, the fuzzer control proxy 130 and other components described herein, it is noted that the process flow 500 may be performed with other components as well.

Block 502 initializes a given fuzzing run intended to test a given system under test. Examples of systems under test are shown in FIG. 1 at 102A and 102N, and in FIG. 2 at 202, 204A, and 204N.

Block 502 may include disabling fuzzing for some period of time, thereby enabling clean traffic to be run against the systems under test. In this manner, disabling fuzzing may provide a baseline or benchmark of expected system performance.

Block 502 may also include enabling fizzing for one or more iterations of fuzz testing. In this manner, enabling fuzzed traffic permit analyzing how the systems under test respond to the fuzzed test cases.

Block 504 receives notification of a particular fuzzing iteration. For example, returning to the date example introduced above, a system under test may be subjected to several iterations of fuzzed date strings, with each iteration using a different fuzzing strategy, or focusing on a different portion of the date string. More particularly, assuming the date is represented in MM-DD-YYYY format, the month, date, and year portions of the date may be targeted using different fuzzing strategies. These different strategies may be testing in respective fuzzing iterations.

Block 504 may thus include receiving a notification that a particular fuzzing iteration is about to be run, or has been run, against the systems under test. This notification may include statistics, details, and parameters related to the fuzzing iteration. Examples of such statistics, details, and parameters are provided in FIG. 4 at 438, and are described above. The notification received in block 504 thus enables correlation of a particularly test case with the results of the test case, as described in further detail below.

Block 506 receives reports of events that occur on the systems under test as a result of running either fuzzed or clean traffic. Examples of detected events are shown in FIGS. 1 and 2 at 136. Additionally, examples of reports of the detected events are shown in FIGS. 1 and 2 at 140.

Block 508 correlates the detected and reported events to particular runs or iterations of clean or fuzzed traffic. In this manner, the process flow 500 relates particular detected events with, for example, the fuzzed traffic that caused the event. Put differently, block 508 establishes a cause-and-effect relationship between a particular test case and the results of that test case.

Block 510 reports the events as correlated with the history of fuzzed and/or clean traffic directed to a particular system under test. Ultimately, the correlated events may be presented to a human tester, as described above, to facilitate reproduction of the event, and resolution of any software bugs contributing to the event.

Figure 6:
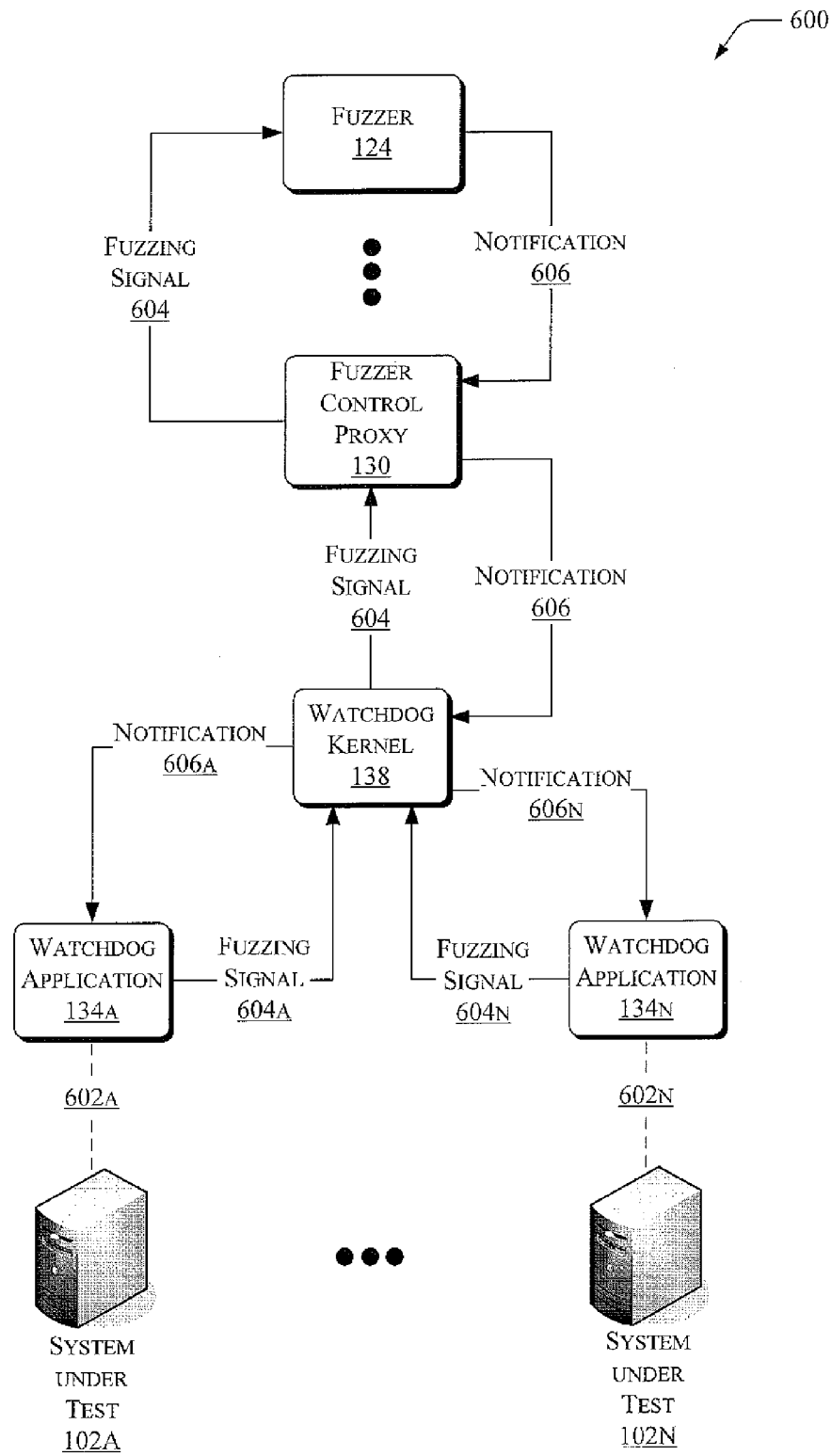
FIG. 6 is a flow diagram relating to a watchdog kernel and watchdog applications that are associated respectively with systems under test.

Having described the process and data flows above related to the FCP, the fuzzer, and the network proxy, the discussion now turns to a more detailed description of the watchdog applications and the watchdog kernel, now presented with FIG. 6.

FIG. 6 illustrates a more detailed operating environment 600 related to the watchdog kernel 138 and the watchdog applications 134A and 134N, which are associated respectively with the systems under test 102A and 102N. The associations between the systems under test and their corresponding watchdog applications are represented by the dashed lines 602A and 602N.

Generally, the watchdog applications monitor the overall health and behavior of their corresponding systems under test. More specifically, the watchdog applications may perform external monitoring, such as determining whether the systems under test are operational, or have crashed or otherwise ceased operating. Additionally, the watchdog applications may perform internal monitoring, examples of which may include tracking CPU loading and utilization, memory usage, heap and stack status, CPU and memory resources allocated to various processes, and the like. FIG. 6 shows two systems under test 102A and 102N, with corresponding instances of the watch dog applications 134A and 134N. In this example, the watchdog application 134A may monitor the system under test 102A in the foregoing manner, while the watchdog application 134N may monitor the system under test 102N.

The watchdog applications 134 may generate respective fuzzing control signals along lines 604A and 604N, which enable the watchdog applications to direct the FCP and the fuzzer whether to direct fuzzed or non-fuzzed traffic to the systems under test. Recall that block 404 in FIG. 4 evaluates whether fuzzing is enabled or disabled. The watchdog applications may enable or disable fuzzing, as described below.

As an example of disabling fuzzing, it may be appropriate for the watchdog applications to request one or more instances of non-fuzzed traffic. The watchdog applications may request that non-fuzzed traffic be routed to the systems under test so that the watchdog applications may establish baselines of performance characteristics for the systems under test. This baseline set of performance characteristics may be useful as a reference point when assessing how the systems under test perform when processing fuzzed traffic.

More specifically, when the systems under test are attacked with the fuzzed traffic, the watchdog applications may compare how these systems process the fuzzed traffic with the baseline established when running the non-fuzzed traffic. Any deviations, spikes, degradations, or other anomalies that occur when the systems under test process the fuzzed traffic may indicate bugs or other security flaws within the systems under test.

As a non-limiting example, assume that the systems under test are being tested to assess their vulnerabilities to buffer overruns. One way to perform this assessment is to deliberately send test strings to the systems under test that are longer than expected. For example, if the systems under test are expecting a particular input parameter to contain at most ten (10) characters, the test may include sending parameters that are fuzzed, so that they contain more than ten characters. However, before sending the fuzzed test parameters, it may be appropriate to gauge the behavior or state of the systems under test when processing one or more non-fuzzed parameters. For example, the person configuring the architecture may specify a ten-character string to be used consistently by the automation driver. The watchdog kernel (WDK) may direct the fuzzer control proxy (FCP) to disable the fuzzing for a certain # of runs, after which the fuzzer may be enabled. Then the fuzzer may generate the test cases which may be greater than ten characters in length. While the systems under test are processing these runs of unfuzzed and fuzzed strings, the watchdog applications may monitor the systems under test, and catalog statistics such as CPU and memory usage, stack and heap status, or any other functions described herein.

Regarding fuzzed traffic, the watchdog applications may request that fuzzed traffic be routed to the systems under test for processing. The fuzzing of clean traffic is described above in FIGS. 3 and 4, and is not repeated here. In any case, the watchdog applications enable or disable fuzzing by asserting appropriate signals on the lines 604. The fuzzing signals may be passed to the watchdog kernel 138, to the FCP 130, and ultimately to the fuzzer 124. Components between the fuzzer and the watchdog applications are shown only for convenience, and may be omitted in implementations of the description herein.

The fuzzer 124 may generate either fuzzed or non-fuzzed traffic, as described above. Examples of the fuzzed traffic are shown in FIG. 1 at 122, and the description thereof is not repeated here. Whether the traffic is fuzzed or not, the watchdog applications may receive notifications 606 from, for example, the fuzzer. The notifications 606 may indicate whether the traffic is being fuzzed or not. If the traffic is fuzzed, the notifications may indicate what type of fuzzing attack is being employed, what type or types of vulnerabilities in the systems under test are being targeted in the attack, or the like.

For convenience only, FIG. 6 shows the notifications 606 as passing through the network proxy (see FIGS. 1 and 2; omitted from FIG. 6), the FCP, and the watchdog kernel. However, it is noted that these notifications may bypass one or of these components without departing from the spirit and scope of the description herein. For ease of reference, the notifications as routed to the watchdog application 134A are denoted at 606A, and the notifications as routed to the watchdog application 134N are denoted at 606N.

Given the notifications 606, the watchdog applications become aware of the types of fuzzing to which the systems under test are to be subjected. For example, on behalf of the watchdog applications, the fuzzer control proxy (FCP) may refer to a data store, such as the attack database 304 shown in FIG. 3, and provide a level of abstraction above the watchdog applications. Accordingly, the watchdog applications may be able to expect and watch for certain behaviors from the systems under test when the systems are processing the fuzzed traffic. Returning to the above buffer overflow example, once the watchdog applications become aware that the systems under test will be subjected to attacks designed to buffer overflows, the watchdog applications may be alerted to watch for symptoms of successful buffer overflow attacks, such as stack overflows, heap corruption, attempts to access restricted portions of memory, or the like.

When and if the watchdog applications detect these types of behavior in the systems under test, the watchdog applications may readily correlate this behavior to the buffer overflow attacks that were indicated in the notifications 606. Therefore, the watchdog applications may establish a cause-and-effect relationship between the notifications and any resulting anomalous behavior in the systems under test, and report accordingly to the watchdog kernel.

On the other hand, the systems under test may not exhibit any anomalous behavior when processing the buffer overflow attacks that were indicated in the notifications 606. In this case, the watchdog applications may report that the systems under test successfully handled the buffer overflow attacks.

In light of the above description, the watchdog applications are described herein are thus distinguished from previous debugging tools and related techniques that merely report exceptions, memory faults, or core dumps, without any awareness of the input data whose processing might have triggered such exceptions, memory faults, or core dumps. Additionally, the watchdog applications may tie the behaviors of the systems under test to a timeframe over which one or more testing attacks were known to have arrived at the systems under test. For example, the watchdog applications may identify a single instance of an attack (e.g., a single fuzzed packet) that caused a discrete issue with the systems under test. Also, the watchdog applications may identify multiple instances of an attack (e.g., multiple fuzzed packets) that caused longer term degradations in the systems under test, for example, memory leaks.

The watchdog applications 134 may take several different forms, depending on the types of fuzz testing to which the systems under test are subjected, and/or the types of security flaws that are of interest to testing personnel. For convenience and ease of understanding, two examples of the watchdog applications are described herein: a file system watchdog, and a denial of service (DoS) detector. However, in providing these examples, it is understood that the watchdog applications may take other forms without departing from the scope and spirit of the description herein.

Figure 7:
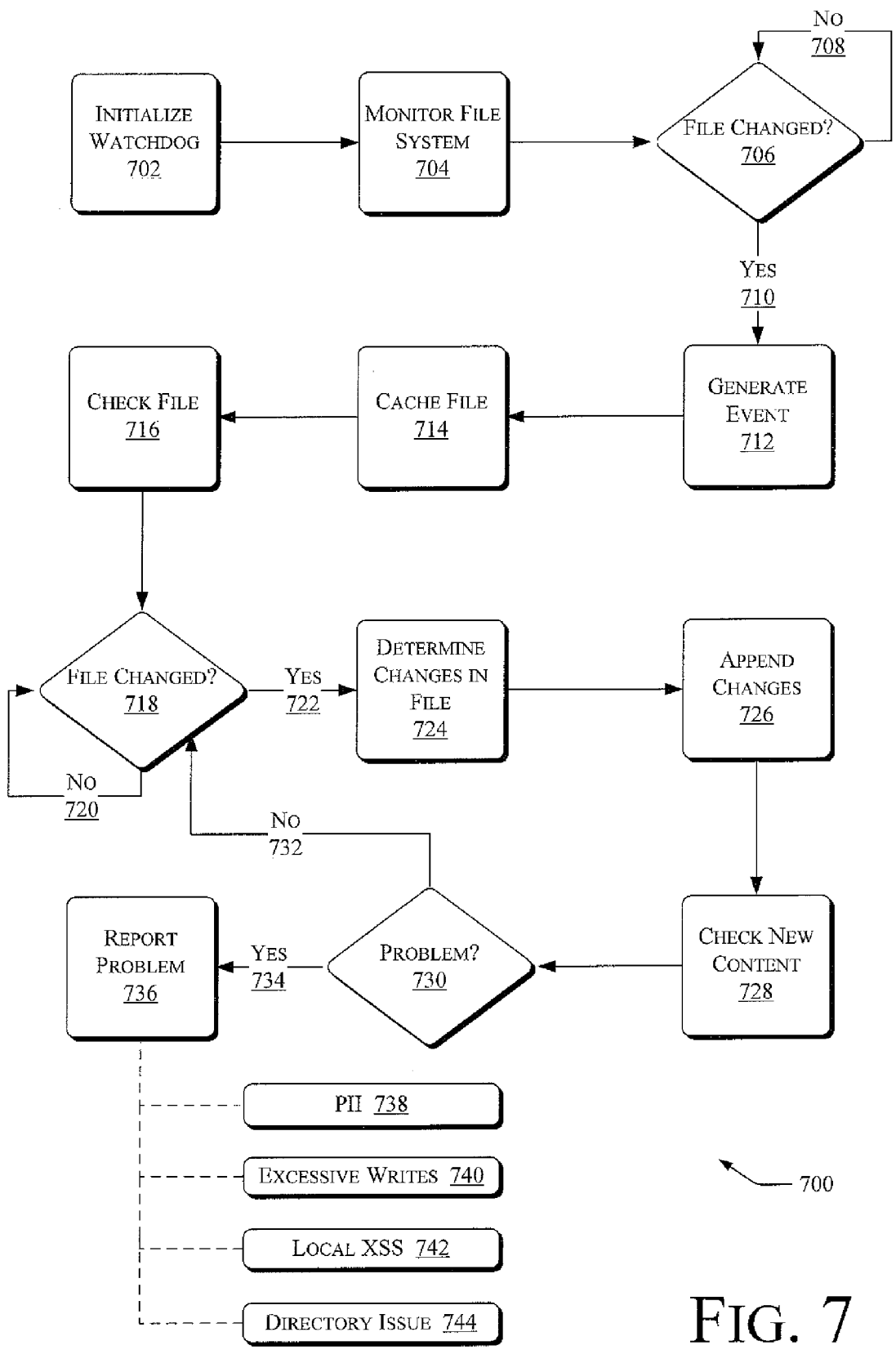
FIG. 7 illustrates a process flow that may be performed in connection with, for example, a file system watchdog application.

Turning first to the file system watchdog, FIG. 7 illustrates a process flow 700 that may be performed in connection with, for example, the file system watchdog. While the process flow 700 is described with the file system watchdog, it is noted that the process flow 700 may be performed with other types of watchdog applications, or more generally, other components, without departing from the scope and spirit of the description herein.

Regarding the file system watchdog specifically, it may be suitable for finding file system vulnerabilities that may be exposed via manual security testing or automated fuzzing. Block 702 configures the file system watchdog may be configured using a suitable configuration or initialization file. For convenience but not limitation, an XML code segment that provides an example for this configuration file is provided below. This configuration file, or one similar to it, may be suitable for loading the file system watchdog:

```
<config>
    <drive>c:\</drive>
    <strings run="false">P@ssW0rd</strings>
    <dirNo run="false">c:\program files\*</dirNo>
    <ExcessiveWrite run="false">10000</ExcessiveWrite>
    <LocalXSSString run="true"><html></html></LocalXSSString>
</config>
```

The example functions in the lines of the above XML code segment are described as follows:

drive: The drive in a system under test to be monitored.

strings: A string or set of strings that a system or application under test should not write to disk (e.g.: passwords, credit card numbers, or other personally identifiable information (PII)). For example, the line may contain a test token string, and the file system watchdog may then watch for any writes that contain this test token string. If any writes contain this test token string, this may indicate that the system under test has failed an attack. Additionally, implementations of the description herein could support regular expressions or other more dynamic matching, for example, "strings that look like credit-card numbers", "strings that look like IP Addresses", or the like.

dirNo run: one or more directories to which the systems or applications under test are not permitted to write. Writes to restricted directories may indicate an attacker being able to control external input that determines which file is written to.

ExcessiveWrites: Identification of areas where an attacker may write arbitrary amounts of data to a hard disk.

LocalXSSString: Used for detecting Local cross-site scripting (XSS) attacks.

As can be appreciated from the foregoing, these functions may be enabled or disabled by the "true" and "false" values contained in the example above. Additionally, one or more parameters may be passed to these various functions through the configuration file.

When the file system watchdog loads, it processes its configuration file in block 702. Afterwards, block 704 monitors the file system, or more generally, the system under test. Recall that the configuration file may specify a particular directory on the system under test to be monitored.

Block 706 tests whether a file that lives under the specified directory has changed. So long as no file has changed in the specified directory, the process flow 700 loops back to block 706 via No branch 708. However, once a file in the specified directory has changed, the process flow 700 takes Yes branch 710 to block 712, which generates an event.

Block 714 caches the changed file for later reference. For example, block 714 may include completely loading the changed file into memory.

Block 716 performs checks on the changed file, to watch for subsequent changes. Block 718 checks for changes to the file on an ongoing basis. So long as no changes occur, the process flow 700 loops back to block 718 via No branch 720. However, when the file changes, the process flow 700 proceeds to block 724 via Yes branch 722.

Block 724 determines differences, or changes, between the cached file and the file as changed. Block 724 may also include determining where in the cached file the changes occurred. In this manner, block 724 may provide logic that determines where in the file new content was written to, so as not to miss cases where sensitive or malicious content was written to the middle of the file.

Block 726 appends the changes to the cached file. For example, block 726 may include adding the changes to an array of cached files, with each entry in the array representing successive changes in the file.

Block 728 checks the new content that was appended in block 726. To enhance overall performance, block 728 may include checking only the new content that was appended in block 726. This approach may avoid rechecking the entire cached file.

Block 730 determines whether the nature of the changes to the cached file indicate a problem or some type of security flaw with the file system under test. If not, the process flow 700 takes No branch 732 to block 718, to continue monitoring for any additional changes to the cached file.

Returning to block 730, if the changes to the cached file indicate a problem, then the process flow 700 takes Yes branch 734 to block 736. Block 736 reports the problem, and may include characterizing the severity of the reported problem. For example, the problem may be reported as a critical problem, as a warning condition, as an information message, or as any other appropriate message. These categories may be specified in, for example, the configuration file referenced in block 702 above. Recall from the discussion above that the fuzzer control proxy (FCP) may recognize and classify different levels of problems, flaws, or bugs.

Block 736 may include reporting the problem to the watchdog kernel 138. For convenience only, and not for limitation, FIG. 7 illustrates several examples of problems that may be reported in block 736.

Block 738 represents reporting that the system under test has improperly written personally identifiable information (PII) in response to a test. Recall that the configuration file above may specify that a test token string is to be considered as PII, and that this string may be included in the fuzzer's test. Afterwards, the file system watchdog may watch for any writes that include this test token string. If this test token string is written, this may indicate to the file system watchdog that the system under test has failed under the fuzzer's test. Additionally, the file system watchdog may employ pattern matting using regular expressions to recognize when the file system writes data that contains PII.

Block 740 represents reporting that the system under test has performed an excessive number of write operations in response to a fuzzing attack. The configuration file may specify a threshold value for excessive write operations. Exceeding this threshold may indicate that the system under test has failed under a denial of service (DoS) attack, which may have been triggered by fuzzed test traffic.

Block 742 represents reporting that the system under test has suffered a local cross-site scripting (XSS) attack. For convenience, but not limitation, a local XSS attack may involve an attacker finding local content installed by an application that allows arbitrary input to be echoed as html/script. The attacker may then create a web page that redirects from the attacker's page to the local, vulnerable content. The URL to the local content would contain malicious script that is evaluated by the vulnerable content and run in, for example, the My Computer zone as defined in the WINDOWS® family of operating systems.

Block 744 represents reporting that the system under test has indicated some type of directory issue. For example, the system may have attempted to write in a file or directory for which access was restricted, as a result of processing fuzzed traffic.

Figure 8:
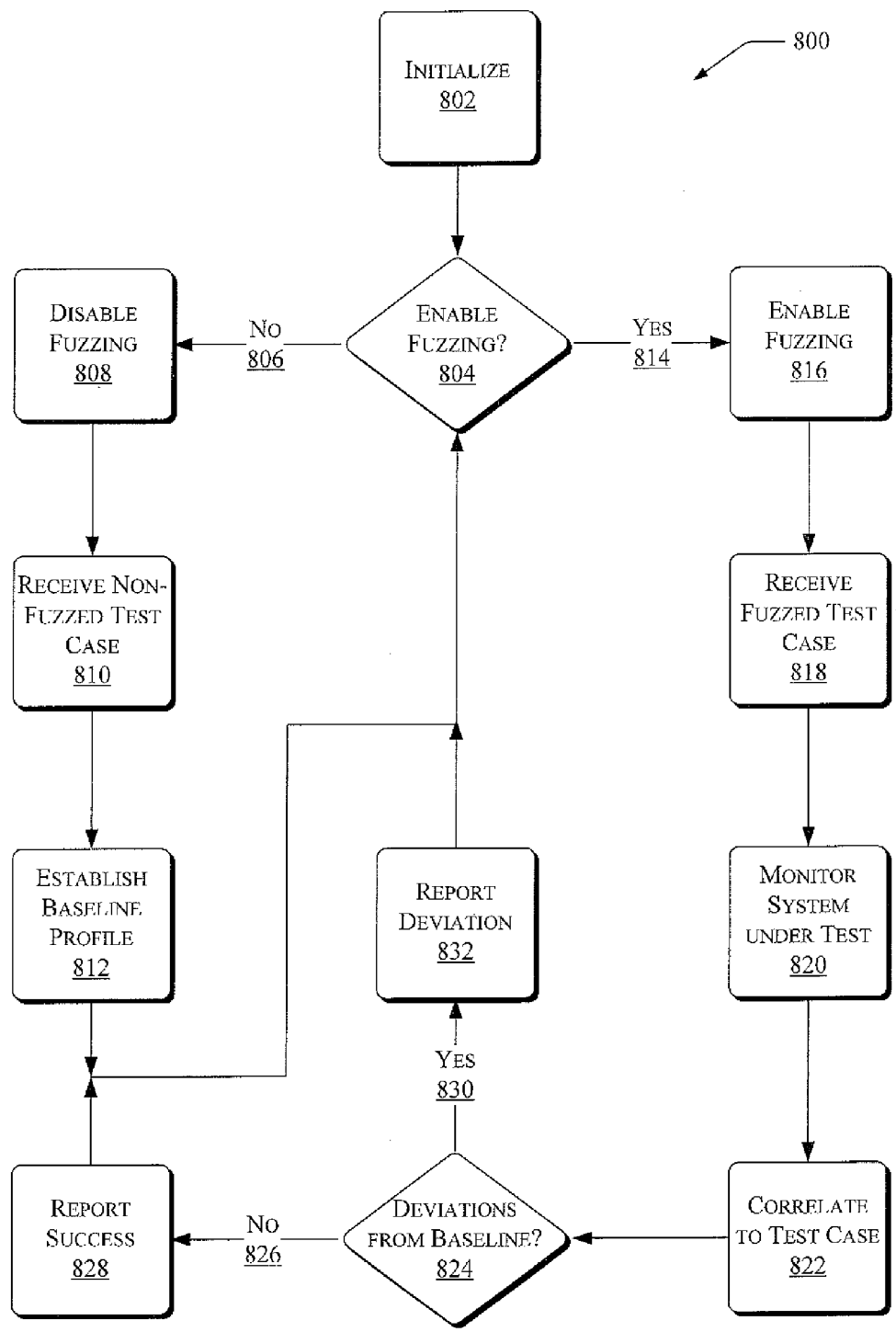
FIG. 8 illustrates a process flow that may be performed by the watchdog application.

Having described the above process flow for the file system watchdog, the discussion now turns to a more generalized description of a process flow that may be performed by the watchdog applications 134, now presented with FIG. 8.

FIG. 8 illustrates a process flow that may be performed by the watchdog applications. In addition to the file system watchdog described with FIG. 7, the watchdog applications 134 may also provide a Denial of Service (DoS) Detector, for detecting performance anomalies caused by security testing, or fuzzing as described herein. FIG. 8 describes a process flow 800 that may be performed by the file system watchdogs generally, with the understanding that the DoS Detector in particular may incorporate aspects of the process flow 800.

Block 802 initializes the watchdog applications for monitoring the systems under test. For example, block 802 may include loading and executing a configuration file, an example of which is provided in the XML code segment discussed above in FIG. 7.

Block 804 determines whether the watchdog applications are to enable or disable fuzzing. The watchdog applications (e.g., the DoS Detector) may monitor both the systems under test and the processes that are running thereon. The DoS Detector may analyze past performance and baselines established during non-fuzzed runs to identify problems that may occur during fuzzed test runs. Block 804 may also include enabling or disabling fuzzing of security test cases to clarify whether any deviations or other issues are caused by tests, or by general machine state issues.

From block 804, if the watchdog applications are to disable fuzzing, then the process flow 800 takes No branch 806 to block 808, where the watchdog applications direct other components of the fuzzing architecture (e.g., the fuzzer 124) to send one or more non-fuzzed test cases to the systems under test.

Block 810 receives notifications of the one or more non-fuzzed test cases. These notifications advise the watchdog applications what tests are being performed on the systems under test. Block 810 may include receiving a plurality of different iterations of a given non-fuzzed test case, and may also include receiving a plurality of different non-fuzzed test cases.

Block 812 establishes or defines a baseline profile indicating how the systems under test perform when processing the non-fuzzed test bases with fuzzing disabled. This baseline profile may then be used afterwards as a point of reference for identifying the symptoms of potential problems that may arise during fuzzed testing.

Returning to block 804, if fuzzing is to be enabled, the process flow 800 takes yes branch 814 to block 816. Block 816 may include directing, for example, the fuzzer, to send fuzzed test cases to the systems under test.

Block 818 receives notifications of the fuzzed test cases as sent to the systems under test. These notifications may provide the watchdog applications with a form of advance notice of what attacks are being run against the systems under test.

Block 820 monitors the performance of the systems under test when processing the fuzzed test cases. Block 820 may include monitoring the systems under test for process crashes and hangs at timed intervals, during or after test runs. However, block 820 may also include monitoring the systems under test for performance that deteriorates or degrades over time, as opposed to crashing altogether. Block 820 may include monitoring several levels of potential degradation, such as detecting any n−1 spikes, determining whether performance has degraded over time (e.g., over the last 10 tests, the last 50 tests, the last 100 tests, etc.), or the like. N−1 spikes refer to spikes and anomalies that occurred in previous runs, as can be detected due to a leveling off in values in current runs. Detection of n−1 spikes allows for analysis over the historical data that has been collected, which provides more power in detecting when bugs may have occurred. Depending on potential severity of any problems, as described below, these measurements may be weighted to better categorize risk for potential vulnerability.

Because of the notification received in block 818, the watchdog applications are advised in advance of what types of attacks are being run against the systems under test. Given this knowledge of the attacks, the watchdog applications may be on the alert for certain types of behavior in the systems under test. Block 820 may include comparing the results of the fuzzed test run to expected results, which may be specified in, for example, a data store such as the attack database, 304. Block 820 may also include comparing the results of the fuzzed test run to the baseline performance profile established in, for example, block 812.

Block 822 correlates the results of processing the fuzzed traffic on the systems under test to particular runs of fuzzed test data. Recall that block 818 receives notifications of the particular runs of fuzzed test data. Block 822 may include associating the results of particular test runs with the notifications of these particular test runs. In this manner, block 822 may establish a cause-and-effect relationship between particular test cases, and the results of processing these particular test cases on the systems under test.

Block 822 may include monitoring parameters such as CPU utilization, number of running threads, memory usage and allocation, number of handles and the like for times when these parameters exceed some defined threshold. Block 822 may include capturing and compiling statistics taken at the beginning and end of a given test.

Block 824 evaluates whether the performance of the systems under test when processing the fuzzed test cases deviates from expected levels of performance, or deviates from the baseline profile established in block 812. If no deviation is detected, the process flow 800 may take No branch 826 to block 828, which reports that the systems under test successfully processed the fuzzed traffic.

Returning to block 824, if deviations are detected, the process flow 800 takes Yes branch 830 to block 832, which reports the deviations. Block 832 may include reporting deviations from baseline performance that, in turn, relate to different levels of reporting. For example, block 832 may report certain percentages of deviation from the baseline as "informational" message. Greater percentages of deviation may be reported as "warning" messages, and still greater percentages of deviation may be may be reported as "severe" messages. Block 832 may include providing generic reporting and logging functionality for in-depth analysis of issues when they occur.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein

The invention claimed is:

1. A method implemented at least in part by a computing device comprising:
    disabling fuzzing for at least one test case to be run against at least one system under test;
    receiving at least one notification of at least one non-fuzzed test case to be run against the system under test;
    establishing a baseline profile indicating performance of the system under test when processing the non-fuzzed test case;
    enabling fuzzing for at least one fuzzed test case to be run against the system under test;
    receiving notification of the fuzzed test case;
    running at least one fuzzed test case against the system under test;
    monitoring the system under test when the system under test is processing the fuzzed test case;
    monitoring the system under test for one or more security flaws;
    detecting whether the system under test contains one or more security flaws; and
    in response to the detection of one or more security flaws, assigning a criticality level to the one or more security flaws.

2. The method of claim 1, further comprising generating handling events based on the criticality level of the one or more security flaws in the system under test.

3. The method of claim 1, further comprising generating a fuzzed test case based on the one or more detected security flaws.

4. The method of claim 3, further comprising selecting the fuzzed test case to be run against the system under test based on the one or more detected security flaws.

5. The method of claim 1, further comprising correlating performance of the system under test when processing the fuzzed test case to a notification of the fuzzed test case.

6. The method of claim 5, further comprising evaluating whether the performance of the system under test deviates from a baseline performance profile associated with the system under test.

7. The method of claim 1, further comprising reporting a deviation from a baseline performance profile associated with the system under test.

8. The method of claim 1, further comprising reporting that the system under test successfully processed the fuzzed test case.

9. A method implemented at least in part by a computing device comprising:
    enabling fuzzing for at least one fuzzed test case to be run against a system under test;
    receiving notification of the fuzzed test case;
    running at least one fuzzed test case against the system under test;
    correlating performance of the system under test when processing the fuzzed test case to the notification of the fuzzed test case;
    monitoring the system under test when the system under test is processing the fuzzed test case;
    capturing system statistics from the system under test at a beginning of a test case;
    capturing system statistics from the system under test while processing the test case;
    capturing system statistics from the system under test at an end of the test case; and
    evaluating the system statistics.

10. The method of claim 9, further comprising based on the evaluation of system statistics, detecting potential bugs in the system under test; and
    categorizing the potential bugs.

11. The method of claim 9, further comprising evaluating whether the performance of the system under test deviates from a baseline performance profile associated with the system under test.

12. The method of claim 9, further comprising reporting a deviation from a baseline performance profile associated with the system under test.

13. The method of claim 9, further comprising reporting that the system under test successfully processed the fuzzed test case.

14. One or more computer-readable media having computer-readable instructions therein that, when executed by a computing device, cause the computing device to perform acts comprising:
    generating at least one fuzzing signal that enables or disables fuzzing of test cases to be received by a watchdog application;
    receiving at least one notification of at least one test case that is to be executed on a system under test that is associated with the watchdog application;
    monitoring the system under test when executing the test case;
    establishing a baseline performance profile for the system under test;
    reporting a deviation from the baseline performance profile; and
    wherein the act of reporting a deviation includes reporting at least one of the following:
        writing of personally identifiable information by the system under test;
        excessive write operations performed by the system under test;
        a successful local cross site scripting attack on the system under test; and
        unauthorized directory accesses by the system under test.

15. The computer-readable media of claim 14, wherein the acts further comprise correlating results of executing the test case with the notification of the test case.

16. The computer-readable media of claim 14, wherein the acts further comprise determining whether execution of the test case on the system under test results in any deviation from a baseline performance profile associated with the system under test.

17. The computer-readable media of claim 14, wherein the act of reporting a deviation includes reporting the deviation to a watchdog kernel component.

* * * * *